Feb. 15, 1927.  
P. JEPSON  
1,617,909  
MACHINE FOR PITTING DRUPACEOUS FRUITS  
Filed July 15, 1925  4 Sheets-Sheet 1
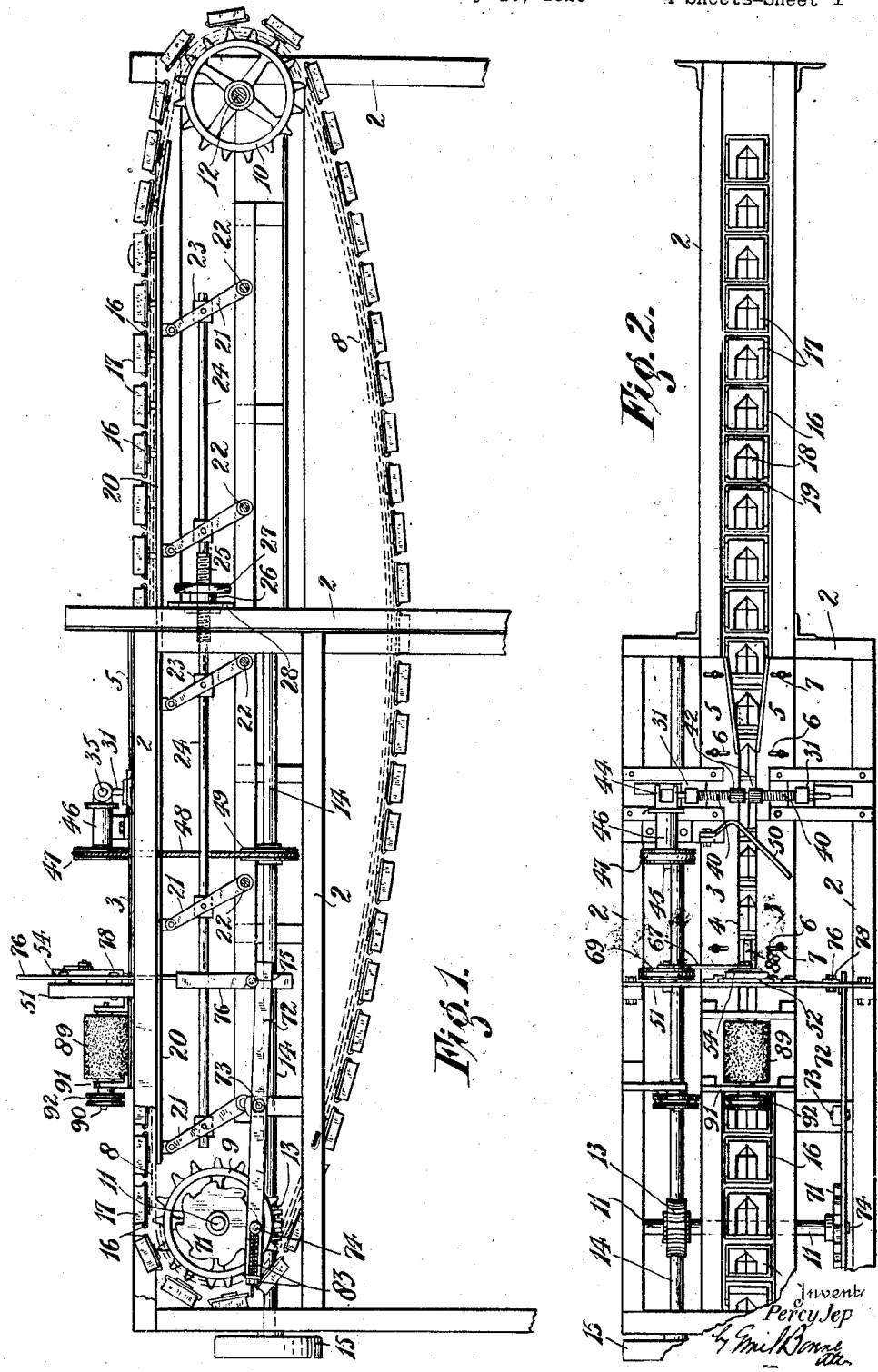

Feb. 15, 1927.
P. JEPSON
1,617,909
MACHINE FOR PITTING DRUPACEOUS FRUITS
Filed July 15, 1925      4 Sheets-Sheet 2
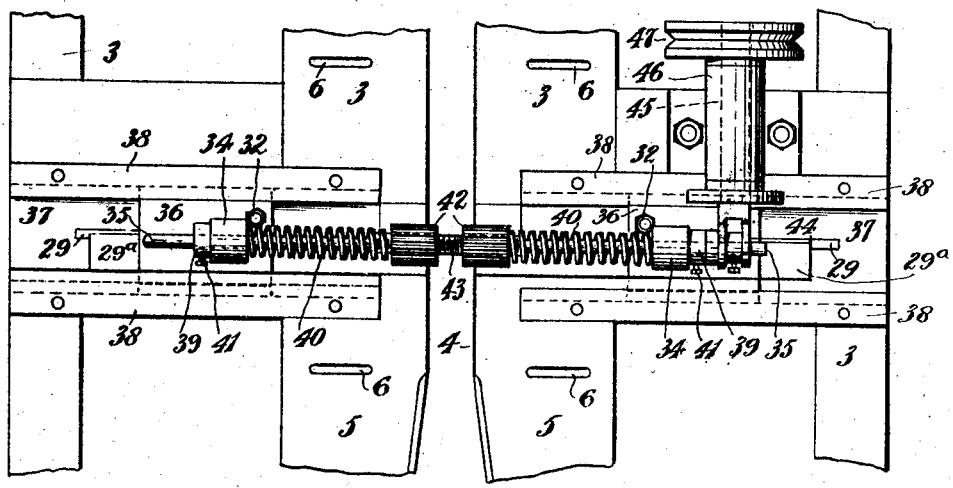
Fig. 3.
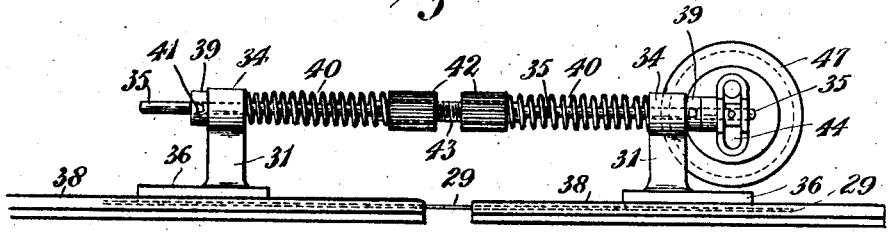
Fig. 4.
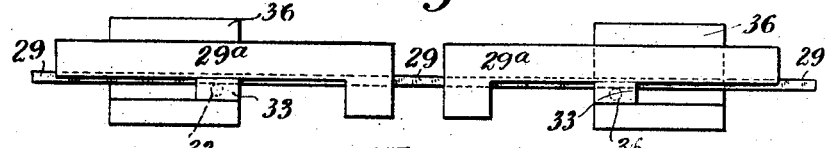
Fig. 5.
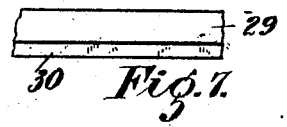
Fig. 7.
Fig. 8.
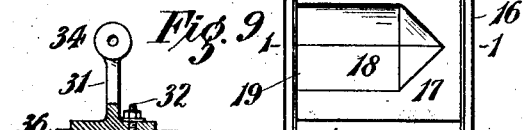
Fig. 9.
Fig. 6.
Fig. 10.
Inventor
Percy Jepson
By
Attorney Feb. 15, 1927.
P. JEPSON
1,617,909
MACHINE FOR PITTING DRUPACEOUS FRUITS
Filed July 15, 1925
4 Sheets-Sheet 3

Inventor:
Percy Jepson
By
Attorney.

Feb. 15, 1927. 1,617,909
P. JEPSON
MACHINE FOR PITTING DRUPACEOUS FRUITS
Filed July 15, 1925   4 Sheets-Sheet 4

Inventor
Percy Jepson
By _____
Attorney

Patented Feb. 15, 1927.

1,617,909

UNITED STATES PATENT OFFICE.

PERCY JEPSON, OF ST. KILDA, VICTORIA, AUSTRALIA.

MACHINE FOR PITTING DRUPACEOUS FRUITS.

Application filed July 15, 1925, Serial No. 43,801, and in Australia August 14, 1924.

This invention relates to an improved machine for pitting peaches, plums and similar drupaceous fruits intended for preserving or canning or for the manufacture of jams and other fruit preserves.

It is an object of the invention to provide an improved machine for pitting fruits whereby wastage of the fruit flesh consequent upon the removal of the stones will be minimized and bruising of the fruit avoided.

A further object of the invention is to provide a pitting machine of compact and relatively simple construction, which in operation is found to be very efficient in the expeditious treatment of fruit, whereby they are halved and have the stones removed in a series of continuous and automatic operations.

According to the invention, the fruits are conveyed by spaced holders to incisor blades which initially slit the fruit to the stone on opposite sides, and subsequently flexible cutters are caused to pass about opposite surfaces of the stone to sever the flesh while closely following the contour of the stone, the said cutters being automatically returned to normal position when freed from contact with the stone of the fruit.

Salient features included in the invention are:—

1. A reciprocating flexible cutter which enters the fruit in straight position, but when the stone is reached is caused to buckle in order to pass about one surface of the stone and, while closely following its contour, to sever the flesh, said cutter automatically returning to normal straight position when freed from contact with the stone.

2. A flexible cutter of looped configuration which is reciprocatably mounted and enters the fruit beneath the stone and is caused to closely follow the contour of the stone in severing the fruit flesh.

3. The use of two flexible cutters which in their operation are caused to conform to the contour of the stones of the fruit being pitted and to cut the fruit flesh around the stones while following their contour.

4. The use of ribbon knives chamfered at their cutting edges to facilitate said knives riding over the stones of the fruit being pitted.

5. The use of reciprocating flexible cutters which are scalloped so as to clear in their reciprocating motion projections on stones of fruit being pitted.

6. The use of cup devices for the fruit to be pitted, said cup devices being mounted on a travelling track and constructed of crepe rubber, sponge rubber or like compressible material formed with recesses to seat and frictionally hold the fruit.

In order that the invention may be clearly understood reference is made to the accompanying drawings, wherein:

Figure 1 is a view in side elevation, partly in section, of the improved pitting machine.

Figure 2 is a plan view of Figure 1.

Figure 3 is a detail view in plan on enlarged scale illustrating the incisor blades, the horizontal flexible cutter and means for reciprocating said flexible cutter.

Figure 4 is a front elevation of Figure 3.

Figure 5 is a view in inverted plan showing the reciprocating flexible cutter fitted in guides and detachably secured at its opposite ends in slidably mounted holders.

Figure 6 is a view in end elevation, partly in section, of one of the slidable holders for the reciprocating flexible cutter.

Figure 7 is an enlarged detail view of a ribbon knife chamfered at its cutting edge.

Figure 8 is a similar view of a chamfered ribbon knife and having a scalloped cutting edge.

Figure 9 is a view in plan of one of the fruit carriers having a rubber cup with a seating recess therein.

Figure 10 is a longitudinal section on line 1—1 of Figure 9.

Figure 11:
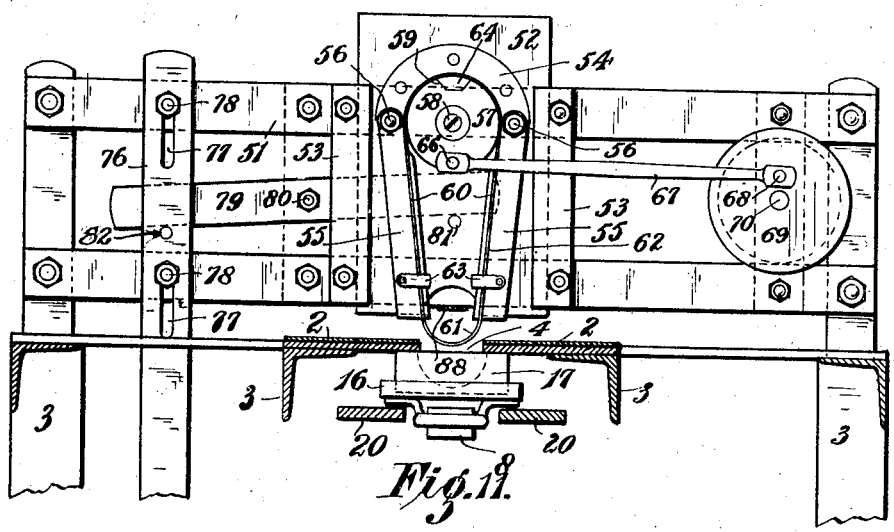
Figure 11 is a view in front elevation of a frame supporting a flexible looped cutter to which vertically reciprocatory and oscillatory motions are imparted.
Figure 13:
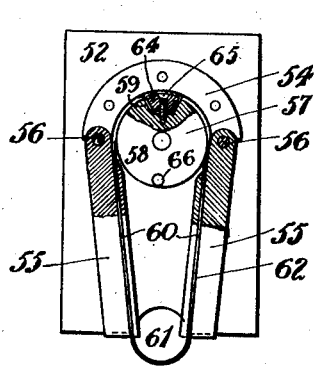
Figure 13 is a detail view partly in section of the looped flexible cutter.
Figure 14:
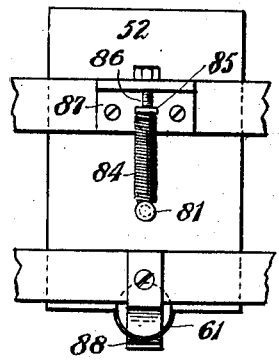
Figure 14 is a rear elevation of the vertical reciprocating plate whereon the looped flexible cutter is mounted.
Figure 15:
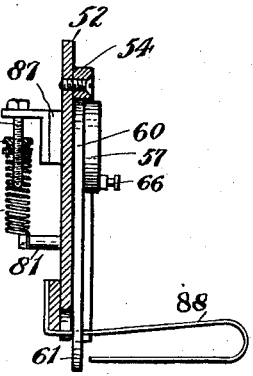
Figure 15 is a view in side elevation partly in section of Figure 14.
Figure 12:
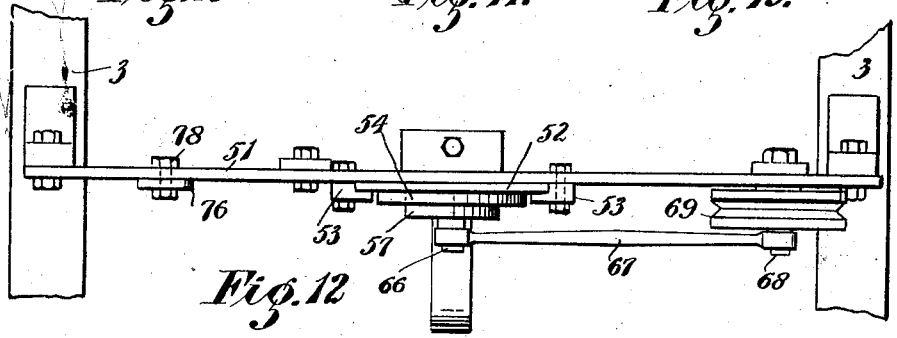
Figure 12 is a plan view of Figure 11.

The main frame 2 of the pitting machine may be of any suitable design and composed of angle-iron bars or constructed of cast metal. Two metal plates 3 are mounted on said frame to provide a table wherein is a central longitudinal space 4. At the forward ends of said plates are incisor blades 5 in V arrangement. The plates 3 have elongated slots 6 through which are passed securing bolts 7, and by lateral adjustment of said plates the width of the central space 4 and the distance apart of the incisor blades 5 can be conveniently regulated.

The incisor blades 5 may be integral with the table plates 3, or if desired, they can be of independent construction and adapted for independent adjustment.

An endless conveyor chain 8 is arranged at the longitudinal centre of the machine and passes around sprocket wheels 9 and 10. The sprocket wheel 9 is fitted on a transverse counter-shaft 11 journaled in bearings at the discharge end of the frame, while the sprocket wheel 10 is fitted on a transverse idle shaft 12 journaled in bearings secured to the feed end of the machine frame. The counter-shaft 11 is driven by worm gearing 13 from a main shaft 14. This main shaft is longitudinally arranged, and is provided with a belt pulley 15 to receive a power transmission belt from a power source.

Secured to alternate links of the conveyor chain are metal holders 16 having their opposite ends bent inwardly to provide dovetail recesses in which are detachably fitted cups 17. These cups are constructed of crepe rubber, sponge rubber or like yieldable material and are sprung into the recesses of the metal holders. Each of said cups has a seating recess 18 substantially of V-shape in cross-section, with an open entrance end 19. Cups of this description are found to be very serviceable as they will accommodate fruits that vary in sizes within certain limits and frictionally grip the same during the feeding and pitting operations, without bruising or otherwise damaging the fruits.

The endless conveyor chain 8 in its forward feeding movement is slidable upon supporting bars 20 arranged longitudinally on opposite sides of the frame. These bars are pivotally secured to the upper ends of short levers 21 arranged in pairs and pivoted at their lower ends on transverse rods 22 fastened to the frame 2. In pivotal engagement with each pair of levers 21 is a metal block 23 which is fastened on a longitudinal pull-rod 24. This pull rod has a screw-threaded portion 25 passed through the tapped boss 26 of a hand-operating wheel 27, which also serves as a nut and is supported by a bracket 28 affixed to the machine frame. The said bracket permits the hand-wheel to be rotated, but also restrains said hand-wheel against longitudinal movement in either direction on the pull-rod 24.

Manipulation of the wheel on said pull-rod actuates the pivoted levers 21 and elevates or lowers the supporting bars 20 whereby the height or inclination of the travelling track is conveniently regulated in order that fruits of different kinds or grades at any one time placed into the cups 17 can be pitted in the manner hereinafter described.

A narrow flexible cutter 29 is arranged transversely of the machine frame, rearwardly of the incisor blades 5, and it bridges the space 4 between the table plates 3. This cutter is preferably constructed of thin ribbon steel less than 1/4" in width and it may have a scalloped cutting edge as illustrated in Figure 8 while it is chamfered on its underside as indicated by 30. For pitting plums and apricots, I prefer to use the plain cutter shown in Figure 7, but that form of flexible cutter illustrated in Figure 8 has been found very effective in pitting peaches. In lieu of ribbon plates, wires or other types of narrow flexible cutters may be employed.

The flexible cutter is slidably supported in slotted guide plates 29ª secured to the machine frame, and it is detachably fastened at its opposite ends to the undersides of holders 31 by bolts 32 having flattened heads 33 which clamp said cutter in position. Said holders have apertured bosses 34 adapting them for free slidable movement on a transverse rod 35, and they are also formed with bases 36 of dovetail shape whereby they are slidably supported in a dovetail groove 37, formed by a pair of plates 38 detachably secured to the machine frame.

The apertured bosses 34 of the slidable holders 31 for the flexible cutter 29 are pressed outwardly so as to abut against collars 39 on said transverse rod 35 by the influence of coiled springs 40 on said rod. The collars are adjustable and locked in required position on said transverse rod by set-screws 41 and the tension of said springs is conveniently regulated by adjustment of milled nuts 42 fitted on the central screw-threaded portion 43 of said rod.

To reciprocate the flexible cutter 29 in a horizontal plane, the transverse rod 35 is fastened at one end to a yoke-frame 44 operated by a crank device secured to one end of a short shaft 45 that is journaled in a bracket bearing 46 attached to the machine frame 2. Fitted on the opposite end of the said shaft 45 is a belt pulley 47, to which motion is transmitted by a belt 48 from a pulley 49 fast on the main driving shaft 14.

Figure 16:
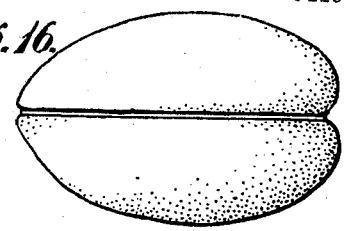
Figures 16 to 26 are diagrammatic views illustrating the several steps or stages of the pitting operation.

Fruit to be halved and pitted is placed into the rubber cups 17 fitted into the holders 16 of the endless conveyor 8, and in the travel of said conveyor forwardly through the machine it is conducted between the angularly set incisor blades 5, which split the fruit centrally to the stone and on the opposite sides thereof. The action of the said incisor blades on the fruit is illustrated in the diagrammatic Figure 16. The incisor blades 5 are slightly inclined with their forward or toe ends arranged at a slightly higher level than their rear or heel ends so that the fruit while being split by said blades is forced tightly into the rubber cups 17.

In the further forward travel of the conveyor, the slit fruit meets the flexible reciprocating cutter 29, the speed of reciprocation of which may be approximately four times that of the speed of travel of the said conveyor.

The said cutter while in the straight position and being reciprocated enters the slitted fruit, but immediately on contacting with the stone it is caused to buckle upwardly to a required extent and proceeds to ride over the upper surface of the stone, being aided in this movement by the chamfer on its underside and at its forward edge. The buckling of the flexible cutter is permitted by the holders 31 sliding inwardly towards each other against the regulatable tension of the coiled springs 40. When the flexible cutter is buckled, the configuration of the stone is closely followed as the tendency of said cutter is to straighten itself. In this respect the stone functions as a cam-like guide for the cutter, which in its reciprocating movements cleanly severs the fruit flesh closely to the stone without injuring the fibres of the fruit flesh.

Immediately the buckled flexible cutter is freed from contact with the stone in the forward travel of the conveyor, the said cutter straightens itself and the holders 31 are slid outwardly by the tension of the springs 40 until the bosses 34 on said holders abut against the collars 39, which latter serve as adjustable limit stops. The cutter thus emerges from the fruit in straight position.

The above described actions of the reciprocating flexible cutter in severing the upper half of the fruit and wherein the stone acts as a cam-like guiding surface for the cutter are progressively illustrated in the diagrammatic views Figures 17, 18, 19 and 20.

The now halved fruit with the stone contained in the lower half but completely severed from the upper half is conducted further forwardly by the conveyor 8, and a deflector 50 adjustably secured to the machine frame 2 and angularly set above the table 3 functions to direct the severed upper half of the fruit from said table into a chute (not shown) on one side of the machine and leading to an appropriate receptacle.

The lower half of the fruit with contained stone is now advanced to a second cutter unit for the purpose of severing the fruit flesh on the underside of the stone.

A subsidiary frame 51 is secured transversely to the upper surface of the machine frame 2, and a plate 52 is vertically slidable in guides 53 secured to the upper bar of said subsidiary frame. Fastened to the face of said slidable plate, or formed integrally therewith, is a semi-circular bar 54 having downwardly extending arms 55 which are pivoted on the bolts 56. A roller 57 is revolvable on a pin 58 projecting outwardly from the plate 52, and it has a peripheral recess 59 substantially of V-shape.

A flexible cutter 60 formed of thin ribbon steel and looped at 61 is accommodated so as to be freely movable in deep recesses 62 provided in the pivoted arms 55, and it is locked against disengagement from said arms by pivoted latch-pieces 63. The opposite ends of said flexible cutter pass around the roller 57 and are then bent to fit into the V-shaped recess 59, wherein they are fastened by a wedge-shaped block 64 and screw 65.

A crank-pin 66 projects outwardly from the face of the roller 57 and receives one end of a connecting rod 67, the opposite end of which is secured to a crank-pin 68 on the face of a belt-pulley 69, that is revolvable on a spindle 70 fitted to a vertical bar of the frame 51. The pulley 69 is rotated from the main shaft 14, and its rotary motion imparts oscillatory movement to the roller 57 and the flexible cutter 60 through the connecting rod 67.

Fitted to the counter-shaft 11 is a cam 71 imparting rocking motion to a lever 72 pivoted at 73 to the machine frame and having a pin 74 in engagement with said cam. Said lever 72 at its opposite end is in operative engagement with a pin 75 on the lower end of a vertical bar 76 having elongated slots 77 and adapted for slidable movement on bolts 78 fitted to the subsidiary frame 51.

A lever 79 fulcrumed on a bolt 80 fastened to said frame 51 has one end bearing upon a stud 81 projecting from the rear surface of the vertically movable plate 52 carrying the flexible and oscillatory cutter 60, while a pin 82 on the upper portion of the vertical bar 76 is adapted to contact with the underside of said fulcrumed lever at its opposite end and impart upward movement thereto.

The cam 71 acting through the rocking lever 72, vertical bar 76 and fulcrumed lever 79 causes downward movement to be imparted intermittently to said plate 52 carrying the cutter 60, and a screw-adjustment 83 for the pin 74 facilitates regulation of the cam action whereby the downward movement of said cutter can be conveniently timed to suit different fruits and sizes of fruits.

The return upward movement of the plate 52 and cutter 60 is effected by a spring 84 having one end anchored to the stud 81 on said plate, while its opposite end is fastened to a nut 85 fitted on a screw 86 passing through a bracket 87 on the subsidiary frame 51 and useful for regulating the tension of said spring.

When the lower half of the fruit with contained stone is brought by the conveyor 8 to the second cutter unit, the plate 52 with flexible looped blade is moved downwardly by the action of the appropriately designed and timed cam 71. Said looped blade is continuously oscillated by the roller 57 actuated by the belt pulley 69 acting through the connecting rod 67, and its looped part 61 is caused in this downward movement to clear the undersurface of the stone, when the tension of the spring 84 draws said blade upwardly against the stone. The blade then closely follows the contour of the stone while severing the fruit flesh therefrom. Immediately the stone is cleared, the looped cutter emerges from the fruit in approximately a horizontal plane, and is elevated to normal position by said spring 84. Thus the action of the cam is merely to cause the cutter to initially clear the forward end of the stone, following which said looped cutter (by reason of its flexible character and the influence of said spring) automatically adapts itself to the contour of the undersurface of the stone in its severing operation. The pivoted arms 55 wherein the upward branches of the looped flexible cutter are fitted can be moved inwardly or outwardly to give the cutter a greater or less bulge according to the sizes and kinds of fruit to be pitted.

A spring pressure finger 88 is fastened to the lower beam of the subsidiary frame 51 and functions to prevent the stones from rising from the lower halves of the fruit until the looped cutter completes its severing operations.

Figure 21:
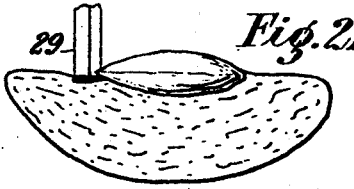
Figure 17:
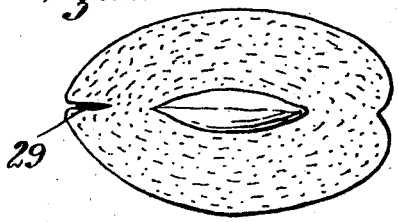
Figure 22:
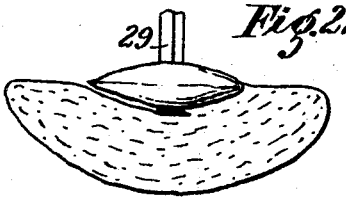
Figure 18:
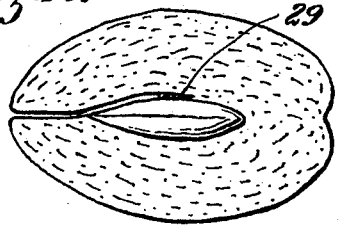
Figure 23:
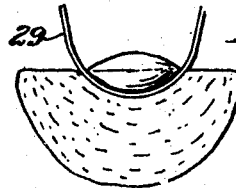
Figure 19:
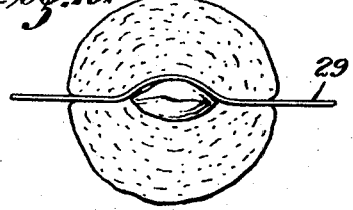

The hereinbefore described actions of the flexible looped cutter on the lower half of the fruit with contained stone are illustrated progressively in the diagrammatic views Figures 21, 22 and 23.

Figure 24:
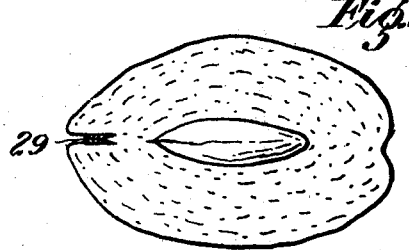
Figure 20:
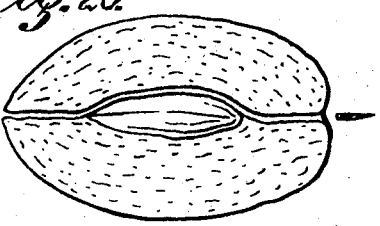
Figure 25:
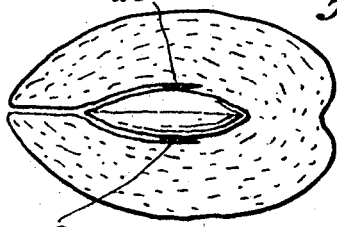
Figure 26:
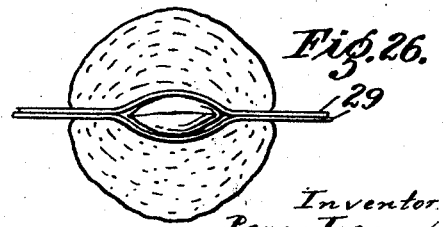

In lieu of the looped cutter hereinbefore described, there may be used a second flexible and reciprocating cutter similar to the flexible cutter 29 for severing the upper part of the fruit flesh. This second cutter would enter the lower half of the fruit when in the straight and be buckled downwardly by suitable mechanical means to follow the contour of the undersurface of the stone and automatically straightening itself when freed from contact with the stone. The action of a second flexible cutter as last described is illustrated in the diagrammatic views Figures 24, 25 and 26.

The stones as they are removed from the lower halves of the fruit are brushed clear of the machine by a rotary brush 89 arranged longitudinally above the space 4 between the table plates 2. Said brush has its spindle 90 revolvable in bracket bearings 91 secured to the machine frame 2. A belt pulley 92 is fitted on the end of the spindle 90, and is driven by a belt from the main shaft 13.

The lower halves of the fruit from which the stones have been removed are conveyed by the rubber cups 17 over the sprocket wheel 9 and gravitationally discharged into a suitable receptacle.

What I do claim is:—

1. In a fruit pitting machine, a frame, a table on said frame having a longitudinal opening, an endless conveyor, means for driving said conveyor, fruit holding cups on said conveyor, incisor blades in V-arrangement at the forward end of said table, said blades having their toe ends inclined to a higher level than their heel ends whereby the fruit split by said blades is forced tightly into said cups in the travel of said conveyor, and means for adjusting the space between said incisor blades.

2. In a fruit pitting machine, a frame, a table on said frame, incisor blades at the forward end of said table, a main shaft, an endless conveyor, fruit holding cups on said conveyor, means for driving said conveyor from said shaft, levers pivoted to said frame, rails for said conveyor pivoted on said levers, a pull-rod, blocks fast on said rod and pivoted to said levers, a bracket on said frame, and a hand-wheel having a tapped boss on a screw-threaded portion of said pull-rod and supported by said bracket for simultaneously actuating said pivoted levers to raise and lower the conveyor rails.

3. In a fruit pitting machine, an endless conveyor and rubber cups mounted on the conveyor, said cups being formed with recesses to accommodate and frictionally hold the fruit to be pitted.

4. In a fruit pitting machine, an endless conveyor and rubber cups mounted on the conveyor, said cups having openings at their forward ends and seating recesses to hold the fruit by the compression of the rubber.

5. In a fruit pitting machine, an endless conveyor, holders secured to said conveyor and provided with dovetail recesses and rubber cups sprung into said recesses and having seating recesses formed in them to frictionally hold the fruit to be pitted.

6. In a fruit pitting machine, a frame, a table on said frame having a longitudinal opening, a main shaft, an endless conveyor, fruit holders on said conveyor, means for driving said conveyor from said shaft, a transverse rod, cutter holders slidable on said table and on said rod, springs exerting outward pressure on said slidable holders, a flexible cutter secured to said slidable holders, and means for imparting reciprocating motion to said rod and thus to said flexible cutter.

7. In a fruit pitting machine, a frame, a table on said frame having a longitudinal opening, angular incisor blades at the forward end of said table, a main shaft, an endless conveyor, fruit holding cups on said conveyor, means for driving said conveyor from said shaft, a transverse rod rearward of said incisor blades, holders slidable on said table and on said rod, a flexible cutter clamped in said holders, springs on said rod exerting outward pressure on said holders, means limiting outward movement of said holders, means for adjusting the tension of said springs, and means for imparting reciprocating motion to said rod and thus to said cutter from said main shaft.

8. In a fruit pitting machine, a frame, a table on said frame having a longitudinal opening, an endless conveyor having fruit-holding devices and a cutter reciprocated across said opening, said cutter being formed of thin flexible steel bevelled at its forward cutting edge.

9. In a fruit pitting machine, a frame, a table on said frame having a longitudinal opening, an endless conveyor having fruit-holding devices, and a cutter reciprocated across said opening, said cutter being formed of thin flexible steel and having a scalloped and bevelled cutting edge.

10. In a fruit pitting machine, a looped flexible cutter, means for imparting oscillatory motion to said cutter, means for imparting intermittent downward movement to said cutter, a spring effecting upward return movement of said cutter, and adjustment means for time regulation of the downward movements of said cutter.

11. In a fruit pitting machine, a frame, a table on said frame having a longitudinal opening, a plate vertically slidable above said table, a roller on said plate, arms pivoted to said plate, guides in said arms, a looped flexible cutter fitted in said guides and secured to said roller, means for oscillating said roller, and means for imparting intermittent downward movement to said plate against spring tension.

12. In a fruit pitting machine, a frame, a table on said frame having a longitudinal opening, a main shaft, an endless conveyor, fruit-holding devices on said conveyor, means for driving said conveyor from said shaft, a plate vertically slidable above said table, a roller on said plate, a flexible and looped cutter secured to said roller, means for oscillating said roller from said main shaft, a counter-shaft driven from said main shaft, a cam on the counter-shaft imparting intermittent downward movement to said plate carrying the flexible cutter, and a spring imparting upward return movement to said plate.

13. A fruit pitting machine comprising a frame, a table on said frame having a longitudinal opening, angularly set incisor blades at the forward end of said table, a main shaft, an endless conveyor, fruit-holding cups on said conveyor, means for driving said conveyor from said main shaft, a horizontal flexible cutter rearward of said incisor blades, means for imparting reciprocating motion to said cutter, a second flexible cutter of looped formation, means for oscillating said looped cutter, means for imparting intermittent downward movement to said looped cutter, a spring effecting upward return movement of said looped cutter, and means for deflecting the severed halves of the fruit and the stones from said table.

In testimony whereof I affix my signature.

PERCY JEPSON.